Nov. 3, 1925.  1,560,358
J. P. TILSON
MIRROR STAND
Filed April 20, 1925
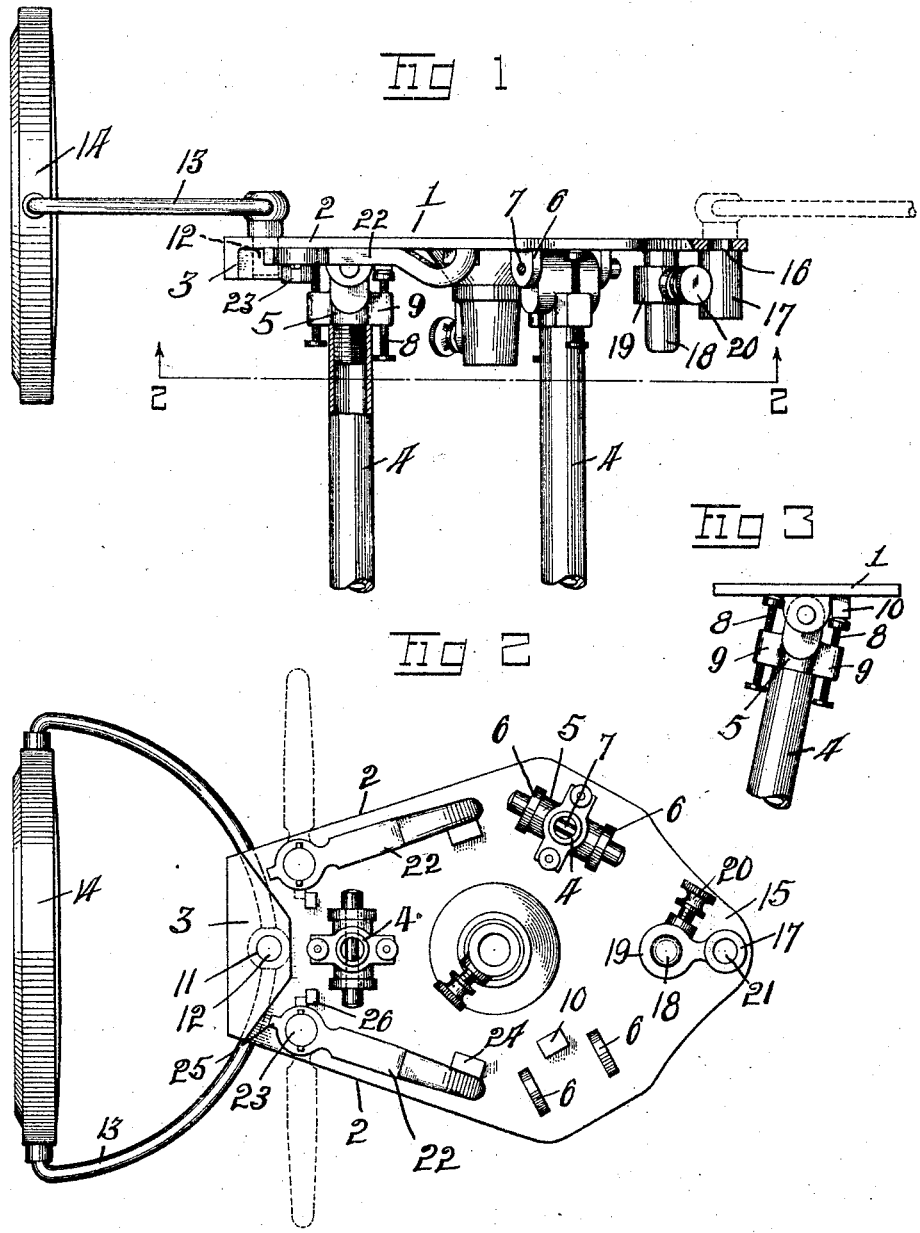
Inventor
Jesse P. Tilson,
By Owen Owen & Crampton,
Attorneys Patented Nov. 3, 1925.

1,560,358

UNITED STATES PATENT OFFICE.

JESSE P. TILSON, OF TOLEDO, OHIO.

MIRROR STAND.

Application filed April 20, 1925. Serial No. 24,309.

*To all whom it may concern:*

Be it known that I, JESSE P. TILSON, a citizen of the United States, and a resident of Toledo, in the county of Lucas and State of Ohio, have invented a new and useful Mirror Stand, which invention is fully set forth in the following specification.

This invention relates to article supports or stands, and has primarily for its object to provide a collapsible stand adapted for use as camp equipment and capable of compactly folding for storing or packing and of being used to support a mirror and other toilet articles.

The invention is fully described in the following specification, and a preferred embodiment thereof is illustrated in the accompanying drawings, in which,—

Figure 1 is an elevation of a stand embodying the invention with parts broken away and with a mirror supported thereby. Fig. 2 is a section on the line 2—2 in Fig. 1 with one supporting leg removed, and Fig. 3 is a detail of the leg adjusting means.

Referring to the drawings, 1 designates the top or platform member of a stand embodying the invention, which top member has the two opposed converging straight side edges 2—2, which terminates in spaced relation at their outer ends to form the narrowed end portion 3 of the top. The top 1 is supported by three legs 4 capable of being spread apart in bracing set-up position, or of being brought together in closed compact relation for storing or packing. Each leg has a head 5 in threaded engagement therewith and adapted to fit between a respective pair of bearing lugs 6 on the underside of the top and to have a shaft 7 projected therethrough and into the bearing lugs to permit rocking movements of the legs radially of the stand. The legs are held in any desired position of adjustment relative to the top by set screws 8, which thread through lateral extensions 9 on opposite sides of the head 5 and adapted to bear at their inner ends against the underside of the top or against a stop lug 10 on the top.

The top 1 at the end 3 thereof is vertically thickened and provided therethrough with an aperture 11 for removably receiving a stud 12, the upper end of which carries a bail member 13 between the free ends of which is pivotally mounted a mirror 14. The opposite end 15 of the top 1 is also preferably provided with an aperture 16 in which the stud 12, or a similar article carrying stud, may be inserted. This end of the top is thin and in order to provide a broadened bearing for the stud, if desired, a bearing 17 is mounted on a stud 18 projected downwardly from the bottom of the top member 1. For this purpose the bearing 17 is provided with a lateral extension 19 having an eye adapted to receive the stud 18 and carrying a set screw 20 for engagement with the stud 18 to secure it in adjusted position thereon. The bearing 17 is provided with an aperture 21 for registering with the aperture 16.

Fingers 22, adapted to form hooks from which articles may be suspended, are pivotally mounted for horizontal swinging movements on studs 23 provided on the underside of the top member 1 near the forward end portion of each straight side edge 2. The fingers 22 when not in use are turned under the member 1 in substantial parallel relation to the respective edge 2 thereof, the inward movement of the finger being limited by a respective stop lug 24 on the table. When it is desired to use the fingers 22, they are turned out into the dotted line position shown in Fig. 2, and their outward movement is limited by a lug 25 on the inner end thereof coacting with a stop lug 26 on the table.

Having thus described my invention, what I claim as new and desire to secure by Letters Patent is:

1. A device of the class described, comprising a top member, pairs of ears on the underside of said member, legs for said member disposed between and pivoted to said ears, lateral extensions on said legs adjacent said member, set screws in said extensions having heads to engage the underside of said member thereby to hold said member in adjusted position and stop lugs on said member against which the heads of said screws are adapted to bear.

2. A device of the class described, comprising a top member, pairs of ears on the underside of said member, legs for said member disposed between and pivoted to said ears, lateral extensions on said legs adjacent said member, set screws in said extensions having heads to engage the underside of said member thereby to hold said member in adjusted position, stop lugs on said member against which the heads of said screws are adapted to bear, and fingers pivoted to the underside of said member adapted to be extended outwardly when in use, and adapted to be wholly positioned inside of said member when not in use, and stops for said fingers for limiting the inward and outward movement thereof.

In testimony whereof I have hereunto signed my name to this specification.

JESSE P. TILSON.